(12) United States Patent
Bhagavathiperumal et al.

(10) Patent No.: US 9,137,174 B2
(45) Date of Patent: Sep. 15, 2015

(54) SYNCHRONIZATION OF OPENFLOW CONTROLLER DEVICES VIA OPENFLOW SWITCHING DEVICES

(71) Applicant: LENOVO ENTERPRISE SOLUTIONS (SINGAPORE) PTE. LTD., New Tech Park (SG)

(72) Inventors: Chidambaram Bhagavathiperumal, Santa Clara, CA (US); Sivakumar Arumugam, Milpitas, CA (US); Dilli Babu Kodamala, Santa Clara, CA (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 362 days.

(21) Appl. No.: 13/826,785

(22) Filed: Mar. 14, 2013

(65) Prior Publication Data

US 2014/0269683 A1    Sep. 18, 2014

(51) Int. Cl.
*H04L 12/70* (2013.01)
*H04L 12/947* (2013.01)
*H04L 12/931* (2013.01)

(52) U.S. Cl.
CPC ............... *H04L 49/25* (2013.01); *H04L 49/00* (2013.01)

(58) Field of Classification Search
None
See application file for complete search history.

(56) References Cited

U.S. PATENT DOCUMENTS

| | | | |
|---|---|---|---|
| 8,755,389 B1 * | 6/2014 | Poutievski et al. | 370/395.31 |
| 2011/0211583 A1 | 9/2011 | Seetharaman et al. | |
| 2011/0307628 A1 * | 12/2011 | Chiba | 709/241 |
| 2011/0317701 A1 * | 12/2011 | Yamato et al. | 370/392 |
| 2012/0147898 A1 | 6/2012 | Koponen et al. | |
| 2013/0010600 A1 | 1/2013 | Jocha et al. | |
| 2013/0039214 A1 | 2/2013 | Yedavalli et al. | |

* cited by examiner

*Primary Examiner* — Alex Skripnikov
(74) *Attorney, Agent, or Firm* — Katherine Brown

(57) ABSTRACT

An OpenFlow switching device of an OpenFlow network sends a message including a flow rule received from a first OpenFlow controller device currently active within the OpenFlow network to a second OpenFlow controller device also currently active within the OpenFlow network. As such, the second OpenFlow controller device stays in synchronization with the first OpenFlow controller device. Upon a third OpenFlow controller device becoming newly active within the OpenFlow network, the OpenFlow switching device sends a message including flow rules of the switching device's flow table to the third OpenFlow controller device. As such, the third OpenFlow controller device becomes immediately up-to-date with respect to this flow table.

18 Claims, 4 Drawing Sheets

SYNCHRONIZATION OF OPENFLOW CONTROLLER DEVICES VIA OPENFLOW SWITCHING DEVICES

BACKGROUND

Network fabrics include devices that are interconnected to one another through a web of various switching devices like routers, hubs, switches, and so on. The network fabrics permit the devices to be interconnected for a variety of different purposes. For instance, the devices may be interconnected to implement a local-area network or a wide-area network for data transmission purposes, to implement a storage-area network, to achieve clustering, and so on.

SUMMARY

An example method includes sending, by a first OpenFlow controller device currently active within an OpenFlow network, a flow rule to an OpenFlow switching device of the OpenFlow network. The OpenFlow switching device is to update a flow table at the OpenFlow switching device with the flow rule. The flow table at the OpenFlow switching device directs the OpenFlow switching device how to dispatch data and frame packets received by the OpenFlow switching device within the OpenFlow network. The method includes responsive to receiving the flow rule, transmitting, by the OpenFlow switching device, a message including the flow rule to a second OpenFlow controller device currently active within the OpenFlow network. The method includes responsive to receiving the message, updating, by the second OpenFlow controller device, a flow table at the second OpenFlow controller device with the flow rule so that the flow table at the second OpenFlow controller device is synchronized with a flow table at the first OpenFlow controller device. The flow table at the first OpenFlow controller device is for the OpenFlow switching device and is maintained by the first OpenFlow controller device, and the flow table at the second OpenFlow controller device is for the OpenFlow switching device and is maintained by the second OpenFlow controller device.

An example storage device stores code executable by an OpenFlow switching device of an OpenFlow network to perform a method. The method includes receiving a flow rule from a first OpenFlow controller device currently active within the OpenFlow network. The method includes updating a flow table at the OpenFlow switching device with the flow rule. The flow table at the OpenFlow switching device directs the OpenFlow switching device how to dispatch data and frame packets received by the OpenFlow switching device within the OpenFlow network. The method includes composing and sending a message including the flow rule to a second OpenFlow controller device currently active within the OpenFlow network. The OpenFlow switching device sends the message so that the second OpenFlow controller device and the first OpenFlow controller device are synchronized with one another with respect to the flow table at the OpenFlow switching device.

An example OpenFlow switching device includes network hardware to communicatively connect the OpenFlow switching device to an OpenFlow network to become part of the OpenFlow network. The switching device includes storage hardware to store a flow table including a plurality of flow rules. The switching device includes update logic to update the flow table with a new flow rule received from a first OpenFlow controller device currently active within the OpenFlow network. The switching device includes synchronization logic to compose and send a message including the new flow rule to a second OpenFlow controller device currently active within the OpenFlow network. The synchronization sends the message so that the second OpenFlow controller device and the first OpenFlow controller device are synchronized with one another with respect to the flow table.

An example system includes a first OpenFlow controller device for an OpenFlow network, and to maintain a first flow table. The system includes a second OpenFlow controller device for the OpenFlow network, and to maintain a second flow table. The system includes an OpenFlow switching device for the OpenFlow network, to dispatch received data and frame packets in accordance with a local flow table updateable by flow rules received from the first OpenFlow controller device and from the second OpenFlow controller device. The OpenFlow switching device is further to synchronize the first flow table with the flow rules received from the second OpenFlow controller device, and to synchronize the second flow table with the flow rules received from the first OpenFlow controller device.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
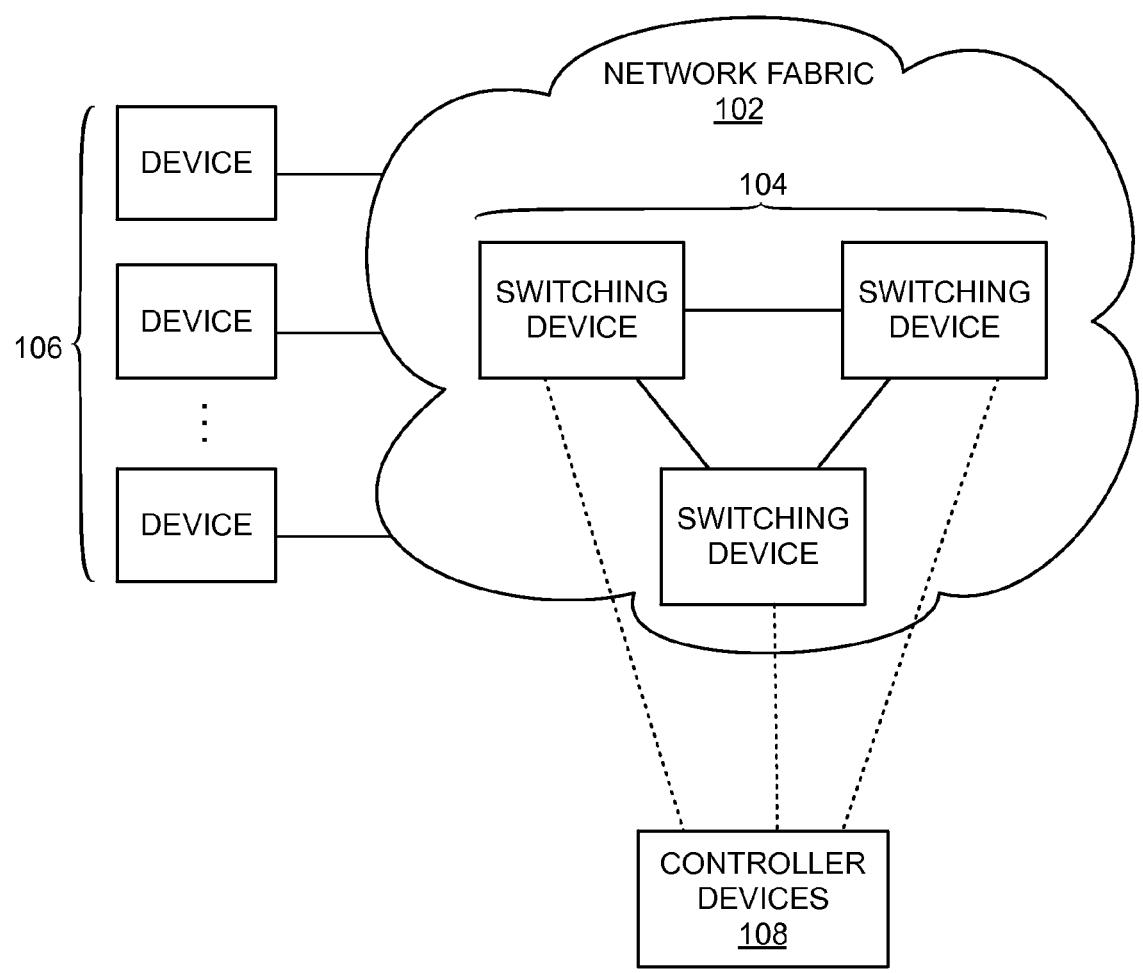
FIG. 1 is a diagram of an example OpenFlow network in relation to which controller device synchronization and updating are performed.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a network fabric, which can be referred to as a network, includes devices that are interconnected to one another through a web of various switching devices like routers, hubs, switches, and so on. As such, the devices can communicate with one another by transmitting data through the network fabric or network, and more specifically via the switching devices routing the data among the devices. The switching devices may more generally be referred to as network devices. Different switching devices are compatible with different protocols.

For example, a traditional protocol that provides for communication among switching devices of a network fabric is a protocol for an open systems interconnection (OSI) model layer, such as what is known as a layer-two protocol. Examples of layer-two protocols include the transparent interconnection of lots of links (TRILL) layer-two protocol, and the shortest-path bridging (SPB) layer-two protocol. The TRILL layer-two protocol is maintained by the Internet Engineering Task Force (IETF), which is an organized activity of the Internet Society (ISOC) based in Reston, Va. The SPB layer-two protocol is maintained as the 802.11 aq standard by the Institute of Electrical and Electronics Engineers (IEEE) based in Washington, D.C.

More recently, software-defined networking (SDN) protocols have been adopted. An SDN protocol differs in at least one respect from a more traditional protocol in that the switching devices can be relatively low cost and so-called "dumb" switching devices that do not have much if any built-in routing logic. Instead, the switching devices are programmed and controlled by an external network fabric controller device over a programming path different than the data path and/or the control path of the network. An example of an SDN protocol is the OpenFlow protocol maintained by the Open Networking Foundation of Palo Alto, Calif., such that a corresponding network fabric controller device is referred to as an OpenFlow network controller. Switching and other network devices are likewise referred to as OpenFlow network devices.

Traditional networking protocols have focused on managing data frames and packets with routing protocols. However, applications do not employ single packets to deliver services, but rather exchange data among devices using a stream of packets in what is known as a flow. The OpenFlow protocol in particular defines a standard for sending flow rules from controller devices to switching devices, so that these switching devices know how to route data packets and frames of a flow as desired. The switching devices in turn add received flow rules to their flow tables. A flow rule can include fields for elements as varied as source and destination media access controller (MAC) addresses, source and destination Internet protocol (IP) addresses, source and destination transmission control protocol (TCP) addresses, virtual local-area network (VLAN) information, quality-of-service (QoS) information, and so on.

A given OpenFlow network can include multiple controller devices and multiple switching devices. Each controller device is able to send flow rules to each switching device for maximum flexibility. However, this means that as to a given switching device, no one controller device may have knowledge of the flow rules of the flow table of the given switching device. If one of the controller devices within the OpenFlow network becomes inactive, the other controller devices remaining active within the network thus do not have complete knowledge of the flow rules that the now-inactive controller device had sent to the switching device. Furthermore, if a new controller device is added to the OpenFlow network and becomes active, it has no knowledge of the flow rules by which the switching device is dispatching data packets and frames.

Disclosed herein are techniques to overcome these shortcomings of conventional OpenFlow networks. When an OpenFlow switching device receives a flow rule from an OpenFlow controller device, it forwards this flow rule to the other active OpenFlow controller devices on the same network. Therefore, if the former OpenFlow controller device becomes inactive, the remaining active OpenFlow controller devices have complete knowledge of the flow rules that the now-inactive controller device sent to the switching device. When a new OpenFlow controller device joins the OpenFlow network and becomes active, the OpenFlow switching device upon connecting to this controller device sends the controller device the flow rules of the switching device's flow table. As such, the newly active OpenFlow controller device has complete knowledge of the flow rules by which the switching device dispatches data packets and frames.

FIG. 1 shows an example OpenFlow network 102, which is a type of network fabric. More generally, the OpenFlow network 102 may be any type of network adhering to an SDN protocol. The OpenFlow network 102 can implement a storage-area network, a local-area or a wide-area network for data transmission purposes, a network to achieve clustering, or another type of network. The OpenFlow network 102 includes OpenFlow switching devices 104, and can also include forwarder devices in the parlance of the OpenFlow protocol. Examples of switching devices 104 include routers, hub, and switches, among other types of devices. The switching devices 104 are OpenFlow switching devices because they adhere to the OpenFlow protocol. More generally, the switching devices 104 may be any type of SDN switching device.

The OpenFlow network 102 permits devices 106 to communicate with one another. In the parlance of the OpenFlow protocol, the devices 106 are nodes that can include target nodes and initiator nodes that initiate communicate with the target nodes. The devices 106 can be logical, virtual, physical, and/or discrete devices, such as computing devices like servers, client computers, other types of client computing devices, server computers, other types of server computing devices, storage devices, and so on, that initiate and receive data requests. The switching devices 104 route data among the devices 106 over the OpenFlow network 102.

OpenFlow controller devices 108 are devices that control the OpenFlow network 102 but which are not technically part of the network 102. The controller devices 108 are OpenFlow controller devices because they adhere to the OpenFlow protocol. More generally, the controller devices 108 may be any type of SDN controller device. The switching devices 104 have hardware to provide for routing of data among the devices 106 in accordance with stored and configurable flow tables having flow rules, but how the switching devices 104 perform this routing is controlled by software thereof that is programmable by the controller devices 108. That is, the controller devices 108 send flow rules to the switching devices 104, which store the flow rules and accordingly route data. The controller devices 108 by comparison do not route data among the devices 106, but rather programs the software of the switching devices 104 for the devices 104 to perform this routing.

The switching devices 104, the devices 106, and the controller devices 108 are communicatively interconnected as indicated in FIG. 1 by two types of lines: solid lines and dotted lines. The solid lines represent transmission of data over data paths or channels. The dotted lines represent transmission of programming information over programming paths or channels, and transmission of control information over control paths or channels.

The data is the actual data that the devices 106 communicate with one another using the OpenFlow network 102 and that the switching devices 104 route within and over the OpenFlow network 102. The control information can include port information, address information, and other types of control information regarding the network devices 104 themselves. The control information can include, or can be used to determine, how the components of the OpenFlow network 102 are interconnected to one another, for instance.

The programming information includes routing tables (i.e., flow tables and their constituent components, like individual flow rules) and/or other types of programming logic. As such, the controller devices 108 can effectively control how the switching devices 104 route data through the OpenFlow network 102 among the devices 106. The controller devices 108 receive control information from the switching devices 104 over a control path or channel.

In FIG. 1, the switching devices 104 ensure that the controller devices 108 are synchronized with one another by sending a flow rule received by a switching device 104 from a controller device 108 to each other controller device 108. In this way, if any controller device 108 becomes inactive, the other controller devices 108 have full knowledge of the flow rules of the flow tables of the switching devices 104. In FIG. 1, the switching devices 104 also ensure that newly active controller devices 108 are immediately updated with the flow rules of their flow tables. When a controller device 108 becomes newly active and a switching device 104 is connected to the controller device 108, the switching device 104 sends to this controller device 108 the flow rules of its flow table. Each of these features is now described in detail.

Figure 2:
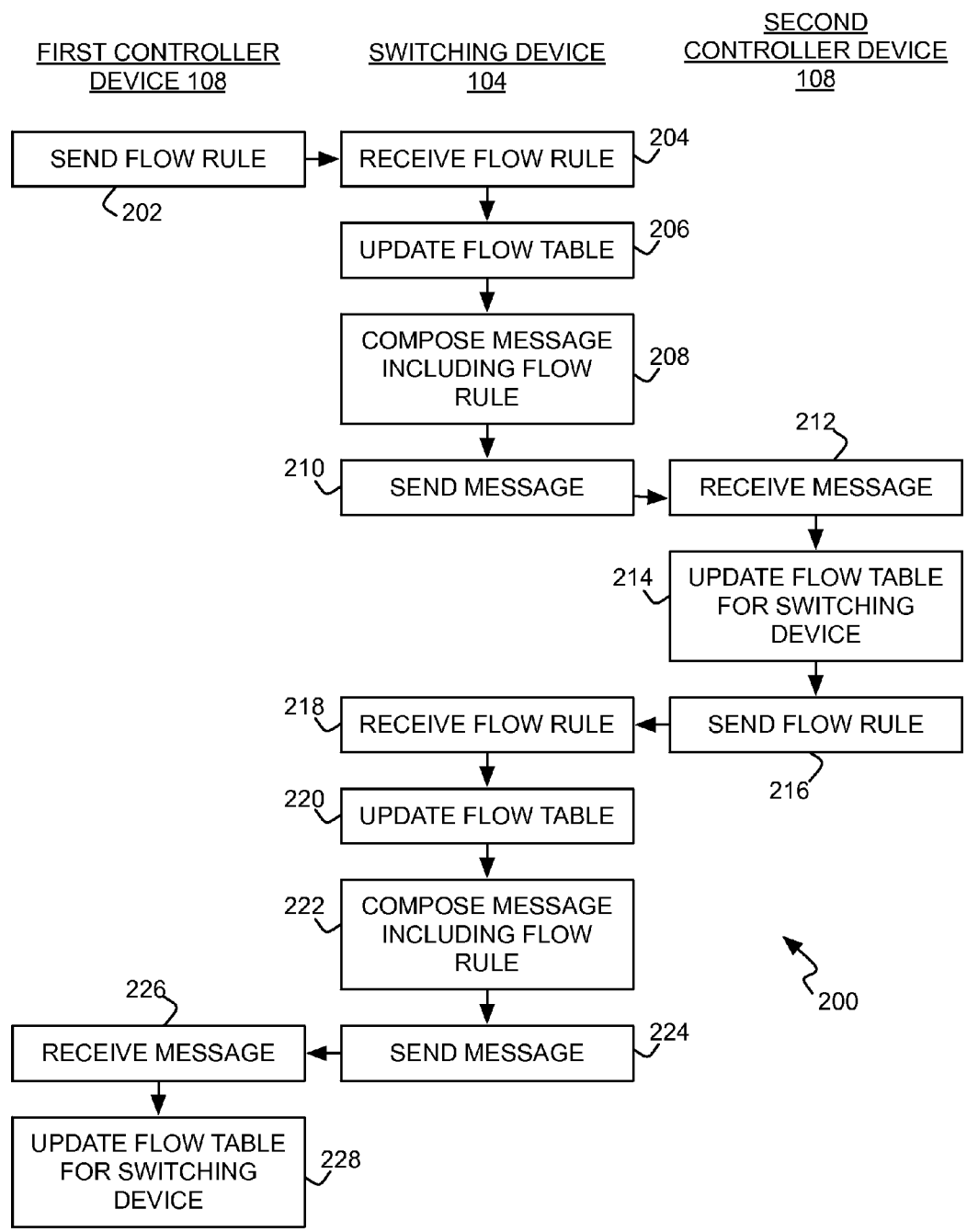
FIG. 2 is a flowchart of an example method for synchronizing two active OpenFlow controller devices in relation to an OpenFlow switching device.

FIG. 2 shows an example method 200 in which controller device synchronization in relation to switching devices is representatively described for two controller devices 108 in relation to one switching device 104. The controller devices 108 are referred to as a first controller device 108 and a second controller device 108 for clarity. Both controller devices 108 are currently active within the OpenFlow network 102, although as noted above, they are not technically part of the network 102, insofar as they do not route data among the devices 106 that are connected to the network 102. Furthermore, the method 200 can be extended to more than two controller devices 108 and more than one switching device 104. In FIG. 2, parts of the method 200 are arranged in columns in accordance with the devices 104 and 108 that perform them.

The first controller device 108 sends a flow rule to program the switching logic of the switching device 104 (202). More specifically, the first controller device 108 sends the flow rule to the switching device 104 to update the flow table at the switching device 104 that directs how the switching device 104 dispatches data and frame packets that it receives within the OpenFlow network 102. For example, the switching device 104 receives a packet at one of its network ports and sends this packet outwards at another of its network ports. How the switching device 104 thus routes such a packet is governed by the flow table. The switching device 104 inspects the flow table in relation to information contained in the packet, such as in the packet's header, and accordingly routes the packet over the OpenFlow network 102.

The switching device 104 thus receives the flow rule from the first controller device 108 (204), and correspondingly updates the flow table at the switching device 104 (206). Assuming this programming of the flow table is successful, the switching device 104 also responsively composes a message that includes the flow rule that was received from the first controller device 108 (208). The switching device 104 forwards, sends, or transmits the message that includes the flow rule to the second controller device 108 (210), which receives the message (212).

Responsive to receiving the message from the switching device 104, the second controller device 108 updates the flow table at the second controller device 108 that the second controller device 108 maintains for or on behalf of the switching device 104 with the flow rule included in the message (214). That is, the second controller device 108 (as well as the first controller device 108) maintains a copy of the flow table by which the switching device 104 routes data packets and frames through the OpenFlow network 102. More generally, each controller device 108 maintains a copy of the flow table by which each switching device 104 dispatches data packets and frames within the OpenFlow network 102.

However, the second controller device 108 is not normally privy to the flow rules that the first controller device 108 sends to the switching device 104 for programming the flow table at the switching device 104. For instance, the OpenFlow protocol itself makes no provisions for such a second controller device 108 receiving this information from the first controller device 108. The technique employed in the method 200 novelly employs the switching device 104 itself to keep the first and second controller devices 108 in synchronization with one another. Each time the first controller device 108 sends a flow rule to the switching device 104 for the switching device 104 to update its flow table, the switching device 104 (as opposed to the first controller device 108) in turn sends the flow rule in a message to the second controller device 108. As such, the second controller device 108 can correspondingly update its copy of the flow table for the switching device 104 without the involvement of the first controller device 108.

Likewise, each time the second controller device 108 sends a flow rule to the switching device 104 for the switching device 104 to update its flow table, the switching device 104 in turn sends the flow rule in a message to the first controller device 108. As such, the first controller device 108 can also correspondingly update its copy of the flow table for the switching device 104 without the involvement of the second controller device 108. In FIG. 2, then, the second controller device 108 sends a flow rule to program the switching logic of the switching device 104 (216), which receives the flow rule (218), and correspondingly updates the flow table at the switching device 104 (220). The switching device 104 also responsively composes a message that includes this flow rule (222), and sends the message to the first controller device 108 (226). Upon and responsive to receiving the message (226), the first controller device 108 updates the flow table at the first controller device 108 that the first controller devices 108 maintains for or on behalf of the switching device 104 with the flow rule included in this message (228).

Therefore, if the first controller device 108 becomes inactive within the OpenFlow network 102, the second controller device 108 can take over in real-time. This takeover is such that the flow table at the switching device 104 and the data packet dispatch performed by switching device 104 in accordance with its flow table are not disturbed. This is because the flow table at the second controller device 108 has been synchronized with the flow table at the first controller device 108. That is, the flow table that the second controller device 108 maintains for the switching device 104 is identical to the flow table at and directly used by the switching device 104 itself. The reverse is also true if the second controller device 108 were to become inactive instead of the first controller device 108. In general, the method 200 ensures that each controller device 108 has a complete copy of the flow rules contained within the flow table of the switching device 104, regardless of from which controller device 108 each flow rule originated.

Figure 3:
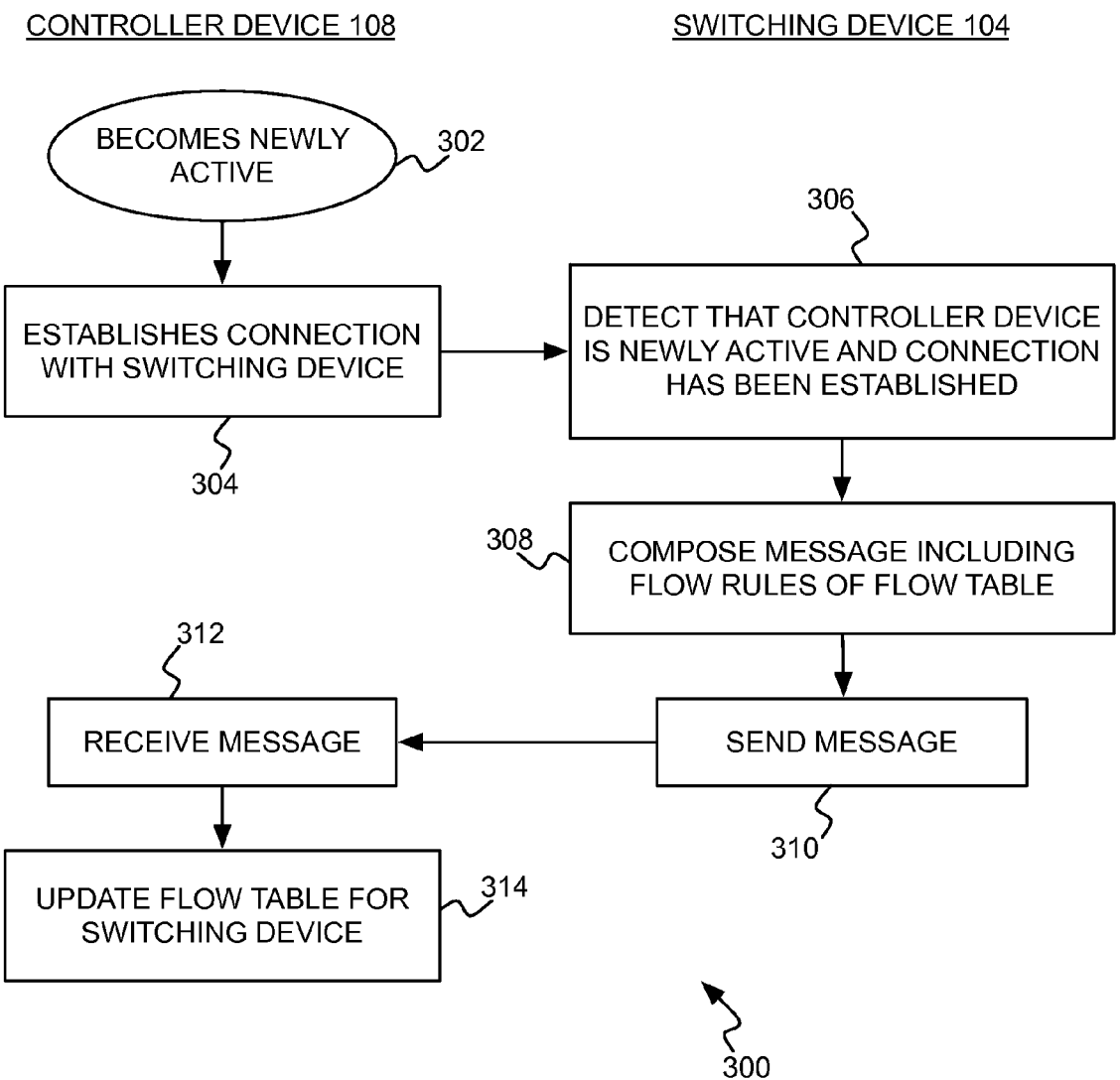
FIG. 3 is a flowchart of an example method for updating a newly active OpenFlow controller device in relation to an OpenFlow switching device.

FIG. 3 shows an example method 300 in which controller device updating in relation to switching devices when controller devices become newly active is representatively described for one such controller device 108 in relation to one switching device 104. The controller device 108 prior to performance of the method 300 is not yet active within the OpenFlow network 102. That is, the controller device 108 is currently inactive. The method 300 can be extended to more than one controller device 108 and more than one switching device 104. In FIG. 3, parts of the method 300 are arranged in columns in accordance with the devices 104 and 108 that perform them.

The controller device 108 becomes newly active within the OpenFlow network 102 (302). For instance, the controller device 108 may be physically connected to the OpenFlow network 102 and turned on. At some point during its initialization, the controller device 108 establishes a connection with the switching device 104 (304). The switching device 104 thus detects that the controller device 108 is newly active, and that a connection has been established between the controller device 108 and the switching device 104 (306).

In response, the switching device 104 composes a message including the flow rules of the flow table at the switching device 104 that governs how the switching device 104 dispatches received data packets and frames (308). For instance, the switching device 104 may scan through the flow table and add each flow rule contained therein to a message. The message may thus be a bulk flow table message in that the message includes all the flow rules of the flow table at the switching device 104.

The switching device 104 sends this message to the controller device 108 (310). Upon receiving the message (312), the controller device 108 updates (or creates) a flow table at the controller device 108 that the controller device 108 maintains for or on behalf of the switching device 104 with the flow rules included in the message (314). As such, the controller device 108 now maintains a copy of the flow table by which the switching device 104 routes data packets and frames through the OpenFlow network 102. This means that the controller device 108 is immediately up-to-date as to the flow table by which the switching device 104 dispatches data over the OpenFlow network 102, and in this respect is no different than any other already active controller device 108 within the network 102.

Note in this respect that the controller device 108, upon becoming newly active within the OpenFlow network 102, is not normally immediately privy to the flow rules of the flow table at the switching device 104. For instance, the OpenFlow protocol itself makes no provisions for such a newly active controller device 108 receiving this information from another controller device 108. The technique employed in the method 300 novelly employs the switching device 104 itself to immediately update the newly active controller device 108 with these flow rules upon the switching device 104 and this controller device 108 establishing a connection with one another. The other controller devices 108 are not involved in this updating process.

Figure 4:
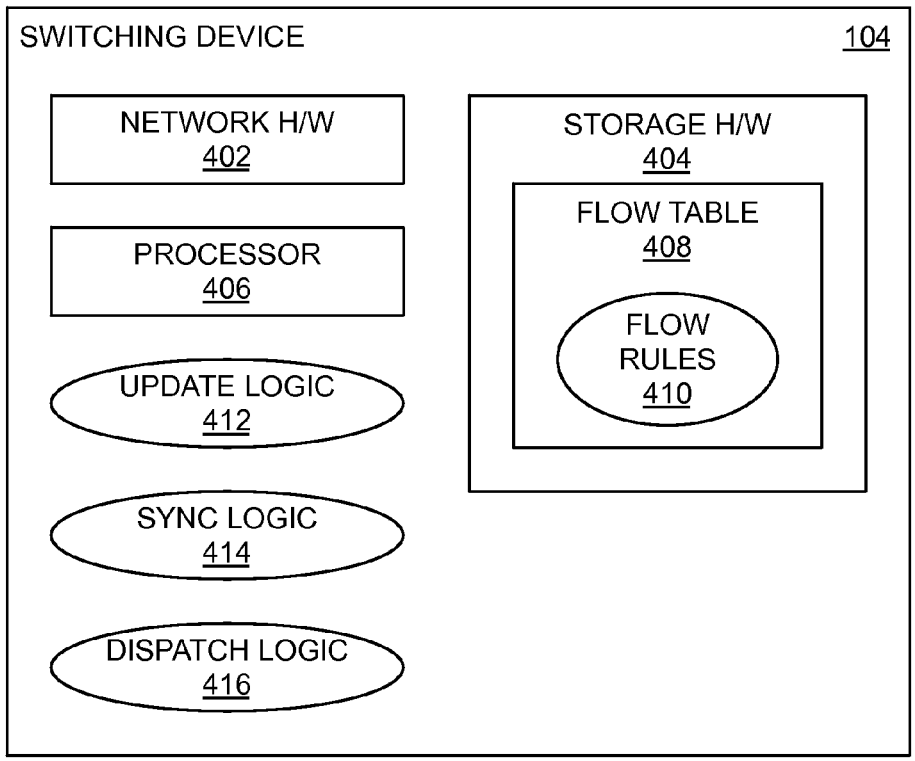
FIG. 4 is a diagram of an example OpenFlow switching device.

FIG. 4 shows an example OpenFlow, or other type of SDN, switching device 104. The switching device 104 is a hardware device, and includes network hardware 402, storage hardware 404, update logic 412, and synchronization logic 414. The switching device 104 can include other components as well, such as a processor 406. The network hardware 402 includes one or more network ports by which the switching device 104 connects to and becomes a part of the OpenFlow network 102, to communicate with the devices 106 connected to the OpenFlow network 102, with other switching devices 104, and with the controller devices 108.

The storage hardware 404 may be or include volatile storage devices and/or non-volatile storage devices. The storage hardware 404 stores a flow table 408 that includes the flow rules 410 in accordance with which the switching device 104 routes data within the OpenFlow network 102. The logic 412, 414, and 416 may each be implemented in hardware, software, or a combination of hardware and software. For instance, each logic 412, 414, and 416 may be implemented as computer code executable by the processor 406 and stored on the storage hardware 404.

The update logic 412 updates the flow table 408 with new flow rules received from the controller devices 108. As such, the update logic 412 performs parts 206 and 220 of the method 200. The synchronization logic 414 composes and sends messages including flow rules received from one controller device 108 to each other controller device 108 so that the controller devices 108 remain in synchronization with one another. As such, the synchronization logic 414 performs parts 208, 210, 222, and 224 of the method 200. The synchronization logic 414 further composes and sends messages including the flow rules 410 to newly active and connected controller devices 108 so that such controller devices 108 are immediately up-to-date. As such, the synchronization logic 414 performs parts 308 and 310 of the method 300. The dispatch logic 416 dispatches data and frame packets received at the network hardware 402 within the OpenFlow network, in accordance with the flow rules 410 of the flow table 408.

Figure 5:
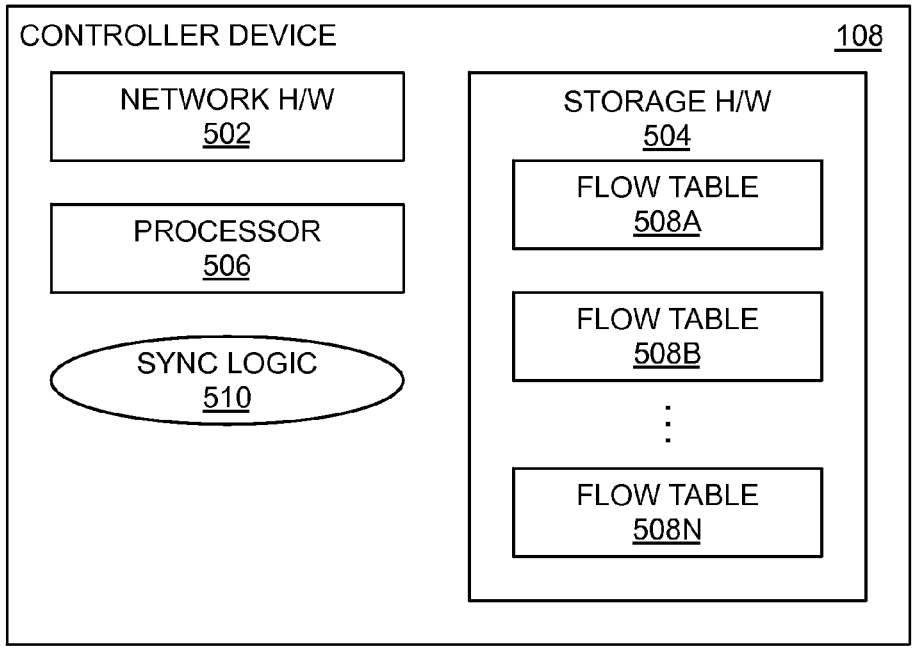
FIG. 5 is a diagram of an example OpenFlow controller device.

FIG. 5 shows an example OpenFlow, or other type of SDN, controller device 108. The controller device 108 is a hardware device, and includes network hardware 502, storage hardware 504, and synchronization logic 510. The controller device 108 can include other components as well, such as a processor 506. The network hardware 502 includes one or more network ports by which the controller device 108 connects to the OpenFlow network 102 to communicate with the switching devices 104 of the network 102.

The storage hardware 504 may be or include volatile storage devices and/or non-volatile storage devices. The storage hardware 504 stores flow tables 508A, 508, . . . , 508N, collectively referred to as the flow tables 508, in correspondence with the switching devices 104 within the network 102. That is, the storage hardware 504 stores a flow table 508 for each switching device 104. A flow table 508 is a copy of the flow table that a corresponding switching device 104 itself maintains, and is maintained in synchronization pursuant to the techniques disclosed herein.

The synchronization logic 510 may be implemented in hardware, software, or a combination of hardware and software. For instance, the logic 510 may be implemented as computer code executable by the processor 506 and stored on the storage hardware 504. The synchronization logic 510 receives messages from the switching devices 104 that include flow rules that the switching devices 104 received from other controller devices 108, and correspondingly updates the flow tables 508. It can be said that the synchronization logic 510 maintains the flow tables 508. The synchronization logic 510 thus performs parts 212 and 214 or parts 226 and 228 of the method 200. The synchronization logic 510 further receives messages from the switching devices 104 that include all the flow rules that the switching devices 104 have stored within their flow tables upon the controller device 108 becoming newly inactive, and correspondingly updates the flow tables 508. As such, the synchronization logic 510 performs parts 312 and 314 of the method 300.

It is finally noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   sending, by a first OpenFlow controller device currently active within an OpenFlow network, a flow rule to an OpenFlow switching device of the OpenFlow network, the OpenFlow switching device to update a flow table at the OpenFlow switching device with the flow rule, the flow table at the OpenFlow switching device directing the OpenFlow switching device how to dispatch data and frame packets received by the OpenFlow switching device within the OpenFlow network;

responsive to receiving the flow rule, transmitting, by the OpenFlow switching device, a message including the flow rule to a second OpenFlow controller device currently active within the OpenFlow network; and responsive to receiving the message, updating, by the second OpenFlow controller device, a flow table at the second OpenFlow controller device with the flow rule so that the flow table at the second OpenFlow controller device is synchronized with a flow table at the first OpenFlow controller device, wherein the flow table at the first OpenFlow controller device is for the OpenFlow switching device and is maintained by the first OpenFlow controller device, and the flow table at the second OpenFlow controller device is for the OpenFlow switching device and is maintained by the second OpenFlow controller device.

2. The method of claim 1, further comprising:

where the first OpenFlow controller device is no longer active within the OpenFlow network, taking over by the second OpenFlow controller device in real-time such that the flow table at the OpenFlow switching device and data packet dispatch performed by the OpenFlow switching device are not disturbed because the flow table at the second OpenFlow controller device is synchronized with the flow table at the first OpenFlow controller device.

3. The method of claim 1, wherein the message is a first message, and the method further comprises:

sending, by the OpenFlow switching device, a second message including a plurality of flow rules of the flow table at the OpenFlow switching device to a third OpenFlow controller device newly active within the OpenFlow network; and responsive to receiving the second message, updating, by the third OpenFlow controller device, a flow table at the third OpenFlow controller device with the plurality of flow rules so that the flow table at the third OpenFlow controller device is immediately up-to-date with the plurality of flow rules of the flow table at the OpenFlow switching device, wherein the flow table at the third OpenFlow controller device is for the OpenFlow switching device and is maintained by the third OpenFlow controller device.

4. The method of claim 1, wherein the flow rule is a first flow rule, the message is a first message, and the method further comprises:

receiving, by the OpenFlow switching device, a second flow rule from the second OpenFlow controller device;

responsive to receiving the second flow rule, transmitting a second message, by the OpenFlow switching device, including the second flow rule to the first OpenFlow controller device; and responsive to receiving the second message, updating, by the first OpenFlow controller device, the flow table at the first OpenFlow controller device so that the flow table at the first OpenFlow controller device is synchronized with the second OpenFlow controller device.

5. The method of claim 4, further comprising:

where the second OpenFlow controller device is no longer active within the OpenFlow network, taking over by the first OpenFlow controller device in real-time such that the flow table at the OpenFlow switching device and data packet routing performed by the OpenFlow switching device are not disturbed because the flow table at the first OpenFlow controller device is synchronized with the flow table at the second OpenFlow controller device.

6. The method of claim 1, further comprising:

updating, by the OpenFlow switching device, the flow table at the OpenFlow switching device.

7. A storage device storing code executable by an OpenFlow switching device of an OpenFlow network to perform a method comprising:

receiving a flow rule from a first OpenFlow controller device currently active within the OpenFlow network;

updating a flow table at the OpenFlow switching device with the flow rule, the flow table at the OpenFlow switching device directing the OpenFlow switching device how to dispatch data and frame packets received by the OpenFlow switching device within the OpenFlow network; and composing and sending a message including the flow rule to a second OpenFlow controller device currently active within the OpenFlow network, wherein the OpenFlow switching device sends the message so that the second OpenFlow controller device and the first OpenFlow controller device are synchronized with one another with respect to the flow table at the OpenFlow switching device.

8. The storage device of claim 7, wherein the message is a first message, and the method further comprises:

detecting that a third OpenFlow controller device is newly active within the OpenFlow network and that a connection has been established with the third OpenFlow controller device; and responsive to detecting that the connection has been established with the third OpenFlow Controller device, composing and sending a second message including a plurality of flow rules of the flow table at the OpenFlow switching device to the third OpenFlow controller device, wherein the OpenFlow switching device sends the second message so that the third OpenFlow controller device is immediately up-to-date with respect to the flow table at the OpenFlow switching device.

9. The storage device of claim 7, wherein the flow rule is a first flow rule, the message is a first message, and the method further comprises:

receiving a second flow rule from the second OpenFlow controller device;

updating the flow table at the OpenFlow switching device with the flow rule; and composing and sending a second message including the second flow rule to the first OpenFlow controller device, wherein the OpenFlow switching device sends the second message so that the first OpenFlow controller device and the second OpenFlow controller device are synchronized with one another with respect to the flow table at the OpenFlow switching device.

10. An OpenFlow switching device comprising:

network hardware to communicatively connect the OpenFlow switching device to an OpenFlow network to become part of the OpenFlow network;

storage hardware to store a flow table including a plurality of flow rules;

update logic to update the flow table with a new flow rule received from a first OpenFlow controller device currently active within the OpenFlow network; and synchronization logic to compose and send a message including the new flow rule to a second OpenFlow controller device currently active within the OpenFlow network,
wherein the synchronization sends the message so that the second OpenFlow controller device and the first OpenFlow controller device are synchronized with one another with respect to the flow table.

11. The OpenFlow switching device of claim 10, wherein the message is a first message, and the synchronization logic is further to compose and send a second message including the plurality of flow rules of the flow table to a OpenFlow controller device newly active within the OpenFlow network,
and wherein the synchronization logic sends the second message so that the third OpenFlow controller device is immediately up-to-date with respect to the flow table at the OpenFlow switching device.

12. The OpenFlow switching device of claim 10, wherein the new flow rule is a first new flow rule, the message is a first message, and the synchronization logic is further to compose and send a second message including a second new flow rule received from the second OpenFlow controller device to the first OpenFlow controller device,
wherein the synchronization logic sends the second message so that the first OpenFlow controller device and the second OpenFlow controller device are synchronized with one another respect to the flow table.

13. The OpenFlow switching device of claim 10, further comprising:
dispatch logic to dispatch data and frame packets received at the network hardware within the OpenFlow network, in accordance with the flow table.

14. A system comprising:
a first OpenFlow controller device for an OpenFlow network, and to maintain a first flow table;
a second OpenFlow controller device for the OpenFlow network, and to maintain a second flow table; and
an OpenFlow switching device for the OpenFlow network, to dispatch received data and frame packets in accordance with a local flow table updateable by flow rules received from the first OpenFlow controller device and from the second OpenFlow controller device, to synchronize the first flow table with the flow rules received from the second OpenFlow controller device, and to synchronize the second flow table with the flow rules received from the first OpenFlow controller device.

15. The system of claim 14, wherein the OpenFlow switching device is to synchronize the first flow table with the flow rules received from the second OpenFlow controller device by sending messages including the flow rules received from the second OpenFlow controller device to the first OpenFlow controller device,
and wherein the OpenFlow switching device is to synchronize the second flow table with the flow rules received from the first OpenFlow controller device by sending messages including the flow rules received from the first OpenFlow controller device to the second OpenFlow controller device.

16. The system of claim 14, wherein where the first OpenFlow controller device was but is no longer active within the OpenFlow network and the second OpenFlow controller device is still active within the OpenFlow network, the second OpenFlow controller devices takes over in real-time for the first OpenFlow controller device such that the local flow table at the OpenFlow switching device and data packet dispatch performed by the OpenFlow switching device are not disturbed because the second flow table is synchronized with the first flow table.

17. The system of claim 14, further comprising:
a third OpenFlow controller device for the OpenFlow network, and to maintain a third flow table,
wherein the OpenFlow switching device is to update the third flow table with a plurality of flow rules of the local flow table upon the third OpenFlow controller device becoming newly active within the OpenFlow network.

18. The system of claim 17, wherein the OpenFlow switching device is to update the third flow table with the flow rules of the local flow table by sending a message including the flow rules of the local flow table to the third OpenFlow controller device.

* * * * *